United States Patent
Gawne

[11] Patent Number: 5,710,777
[45] Date of Patent: Jan. 20, 1998

[54] COMMUNICATION SYSTEM

[75] Inventor: Simon C. Gawne, Middlesex, England

[73] Assignee: Madge Networks Limited, Bucks, England

[21] Appl. No.: 14,258

[22] Filed: Feb. 5, 1993

[30] Foreign Application Priority Data

Feb. 7, 1992 [GB] United Kingdom ............ 9202666

[51] Int. Cl.[6] ............................................. G01R 31/28
[52] U.S. Cl. .................. 371/20.6; 370/222; 370/225; 395/183.19; 395/200.02
[58] Field of Search ............... 371/20.6, 20.1, 371/71; 364/926.9; 395/183.01, 183.19, 200.02, 200.21; 370/222, 225

[56] References Cited

U.S. PATENT DOCUMENTS

| | | | |
|---|---|---|---|
| Re. 33,521 | 1/1991 | Mori et al. | 364/265.1 |
| 4,145,734 | 3/1979 | Brenvenu | 364/200 |
| 4,360,870 | 11/1982 | McVey | 364/200 |
| 4,486,829 | 12/1984 | Mori et al. | 364/200 |
| 4,683,563 | 7/1987 | Rouse et al. | 370/16 |
| 4,733,391 | 3/1988 | Godbold et al. | 370/88 |
| 4,807,224 | 2/1989 | Naron et al. | 371/32 |
| 4,881,220 | 11/1989 | Yomogida et al. | 370/16 |
| 4,933,936 | 6/1990 | Rasmussen et al. | 370/85.9 |
| 4,937,823 | 6/1990 | Bekki et al. | 371/11.2 |
| 5,105,188 | 4/1992 | Jung et al. | 370/85.12 |
| 5,226,123 | 7/1993 | Vockenhuber | 395/325 |
| 5,283,783 | 2/1994 | Nguyen et al. | 370/16.1 |
| 5,301,303 | 4/1994 | Abraham et al. | 395/500 |

*Primary Examiner*—Robert W. Beausoliel, Jr.
*Assistant Examiner*—Dieu-Minh Le
*Attorney, Agent, or Firm*—Sughrue, Mion, Zinn, Macpeak & Seas, PLLC

[57] ABSTRACT

A method of analysing a communication system to locate the source of a fault. The communication system comprises a signal carrying medium (9) coupled to a series of end station ports (2-6) which enable respective end stations (24) to transmit signals onto and receive signals from the medium and a controller (8) to control connection of end stations (24) to the medium via the ports (2-6). The method comprises disconnecting end stations (24) in series from the medium (9) in response to detection of a fault and then detecting whether the fault still exists. A fault analyzer (10) adapted to respond to the detection of a fault causes the controller (8) firstly to disconnect an end station (24) which has previously been characterised as the most likely source of a fault. The controller (8) may disconnect groups of end stations (24) and reconnect subgroups if no fault is present in the group which was not disconnected until the faulty end station is identified.

10 Claims, 2 Drawing Sheets

COMMUNICATION SYSTEM

FIELD OF THE INVENTION

The invention relates to a communication system, for example a ring communication system or an open ended system, having a number of end station ports which enable respective end stations (such as computers and word processing terminals) to transmit onto and receive signals from a signal carrying medium.

DESCRIPTION OF THE PRIOR ART

Communication systems of this type are highly sophisticated and rely on complex protocols to enable communication to be achieved between end stations connected to the signal carrying medium. Examples of such protocols are the token ring protocol and the FDDI system. These protocols incorporate certain fault recovery procedures if a fault should arise within the system. However, with increasing numbers of end stations being connected to communication systems, the existing fault recovery techniques tend to be slow and in addition the existing fault recovery procedures provide incomplete protection against the erroneous operation of the end stations themselves, against any out of specification operation of the system or major cable faults.

Conventionally, ports are connected via so-called hub units which themselves can incorporate certain intelligence to enable faults to be detected. For example, in one type of hub unit, additional end stations within the hub are incorporated on the system which are used simply to detect if the network or system is operational or faulty. Internal control circuits can then process the information returned by the end stations and force other end stations connected to the hub to be removed in turn until the network or system is again operational.

As mentioned above, these fault recovery techniques can be slow particularly in practical implementations where 80 or more end stations may be connected to a single hub. Multiple faults will further increase fault recovery time.

SUMMARY OF THE INVENTION

In accordance with one aspect of the present invention, a method of analysing a communication system to locate the source of a fault, the system comprising a signal carrying medium coupled to a series of end station ports which enable respective end stations to transmit signals onto and receive signals from the medium; and control means for controlling the connection of end stations to the medium via the ports, comprises, upon detection of the fault, disconnecting end stations in series from the medium and detecting whether or not a fault condition still exists, characterized in that fault analysis means adapted to respond to the detection of a fault causes the control means firstly to disconnect an end station which has previously been characterised as the most likely to be the source of the fault.

In contrast to conventional techniques in which the end stations are removed one by one in some essentially random manner unrelated to the likelihood of a fault, this aspect of the invention enables at least the first station which is disconnected to be one which is more likely to have caused the fault. For example, the first end station to be disconnected could be the most recent end station to have been connected to the system or the last end station which has been diagnosed as causing a fault.

This process could be extended so that if the first end station to be disconnected is found not to be the cause of the fault, then the next end station to be disconnected could be the one which is characterised as the next likely to be the source of the fault. For example, if the first station to be disconnected is the last to have joined then the next to be disconnected could be the last to have been diagnosed as causing a previous fault. Alternatively, the second and succeeding stations to be disconnected could be those which have joined the system in increasing times.

In accordance with a second aspect of the present invention, a method of analysing a communication system to locate the source of a fault, the system comprising a signal carrying medium coupled to a series of end station ports which enable respective end stations to transmit signals onto and receive signals from the medium; and control means for controlling the connection of end stations to the medium via the ports, the method comprising a) causing the control means to disconnect a group of the end stations;

b) detecting whether the fault exists;

c) i) if it does, disconnecting a group of the remaining end stations, or ii) if it does not, reconnecting a number of end stations of the previously disconnected group;

d) detecting whether the fault exists; and, e) repeating steps (c) and (d) until the end station causing the fault is located.

This method provides a rapid and systematic way of locating a faulty end station in contrast to the station by station method used conventionally.

Preferably, the group of stations which are disconnected at each stage will be substantially half of the remaining end stations.

In accordance with a third aspect of the present invention, a communication system comprises a signal carrying medium coupled to a series of end station ports which enable respective end stations to transmit signals onto and receive signals from the medium; and control means for controlling the connection of end stations to the medium via the ports; and fault analysis means for detecting the source of the fault on the system, the fault analysis means being adapted to carry out a method according to the first or second aspect of the invention.

Typically, the control means and fault analysis means are provided within a concentrator unit and will be defined at least in part by a suitably programmed microprocessor.

The aspects of the invention described above are applicable both to ring and open ended communication systems.

In the case of ring communication systems, for example based on token ring protocols, the protocol provides a so-called error recovery facility in which when a fault is detected, an error recovery frame is transmitted around the ring indicating the address of one or more end stations adjacent to the fault. Previously, this information has simply been displayed on a monitor and the operator has had to deduce from that information the source of the fault.

In accordance with a fourth aspect of the present invention, a communication system comprises a signal carrying medium coupled to a series of end station ports which enable respective end stations to transmit signals onto and receive signals from the medium; control means for controlling the connection of end stations to the medium via the ports; and fault analysis means for detecting the source of a fault on the system, wherein the system is in the form of a ring and data communication is under the control of a protocol which includes a fault analysis routine in which the address of one or more end stations adjacent the fault is communicated to other end stations on the ring, the fault analysis means responding to the receipt of such an end station address to determine the location of the fault.

This system, in contrast to the conventional systems, provides an automatic ray of determining the source of the fault and in particular the address and then location of an end station causing the fault or connected to equipment such as cabling which has become faulty.

BRIEF DESCRIPTION OF THE DRAWINGS

Some examples of communication systems and methods for operating those systems in accordance with the invention will now be described with reference to the accompanying drawings, in which:

Embodiment

FIG. 1 illustrates a concentrator 1 having a number of ports 2-6 each of which comprises a ring bypass switch 7 controlled by a control circuit 8 incorporating a microprocessor. Each bypass switch 7 can be controlled either to pass received signals directly from an input port to an output port or to an end station coupled to the switch. Typically, there may be up to 80 or more ports in a concentrator but for simplicity only five are shown in FIG. 1.

The concentrator 1 is connected to the remainder of the network via a uni-directional communication medium 9 such as copper wire or optical fibre. Whenever an end station forms part of the ring communication system, the ring includes the end station so that data or signals pass through the appropriate ring bypass switch 7 through the end station, back to the bypass switch 7 and then on to the next bypass switch 7 of the next end station.

The concentrator 1 also includes a pair of monitor end stations or nodes 10,30 one of whose purposes is to detect the presence of faults on the ring.

Figure 1:
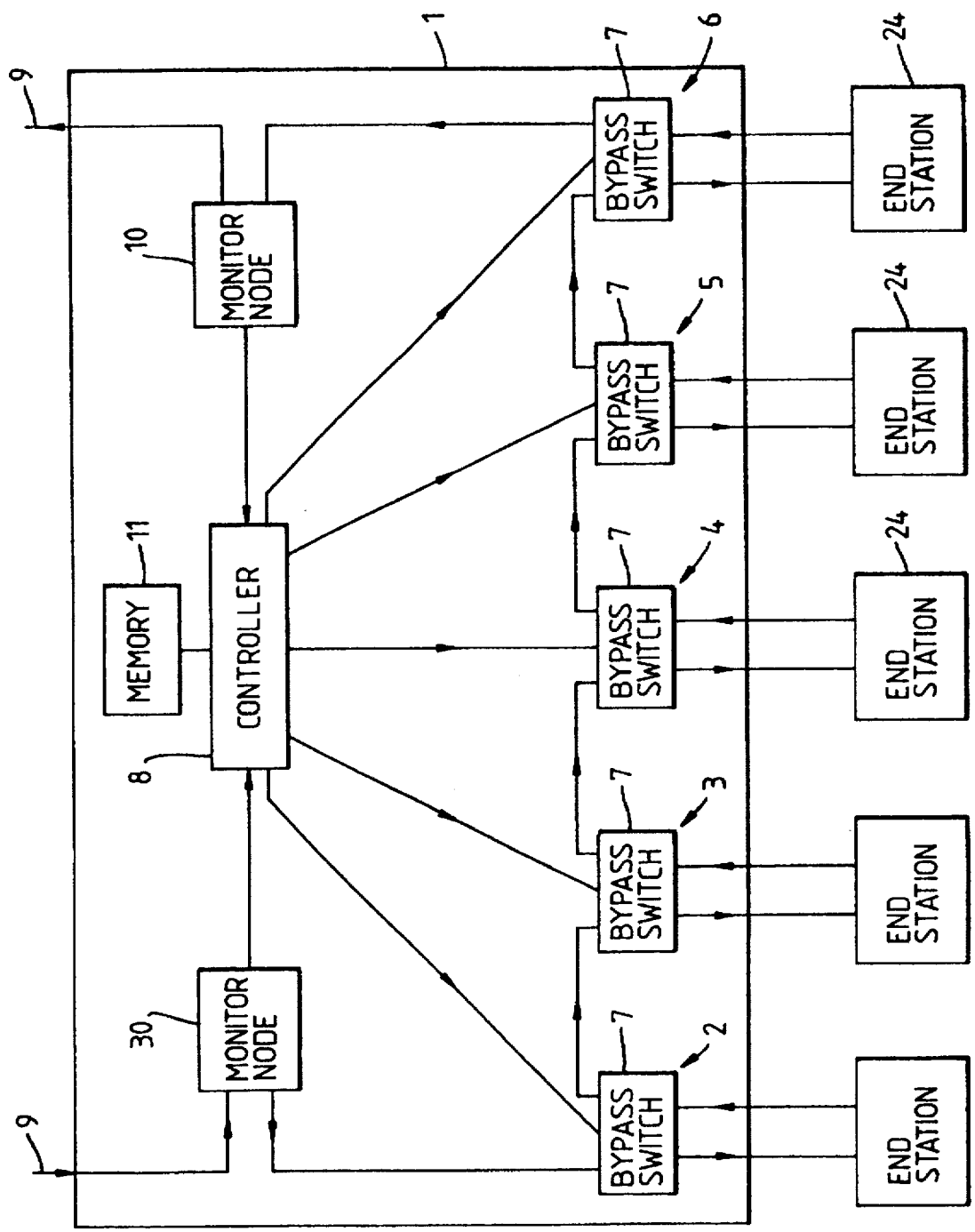
FIG. 1 illustrates in block diagram form a hub or concentrator forming part of the system according to the invention.
Figure 2:
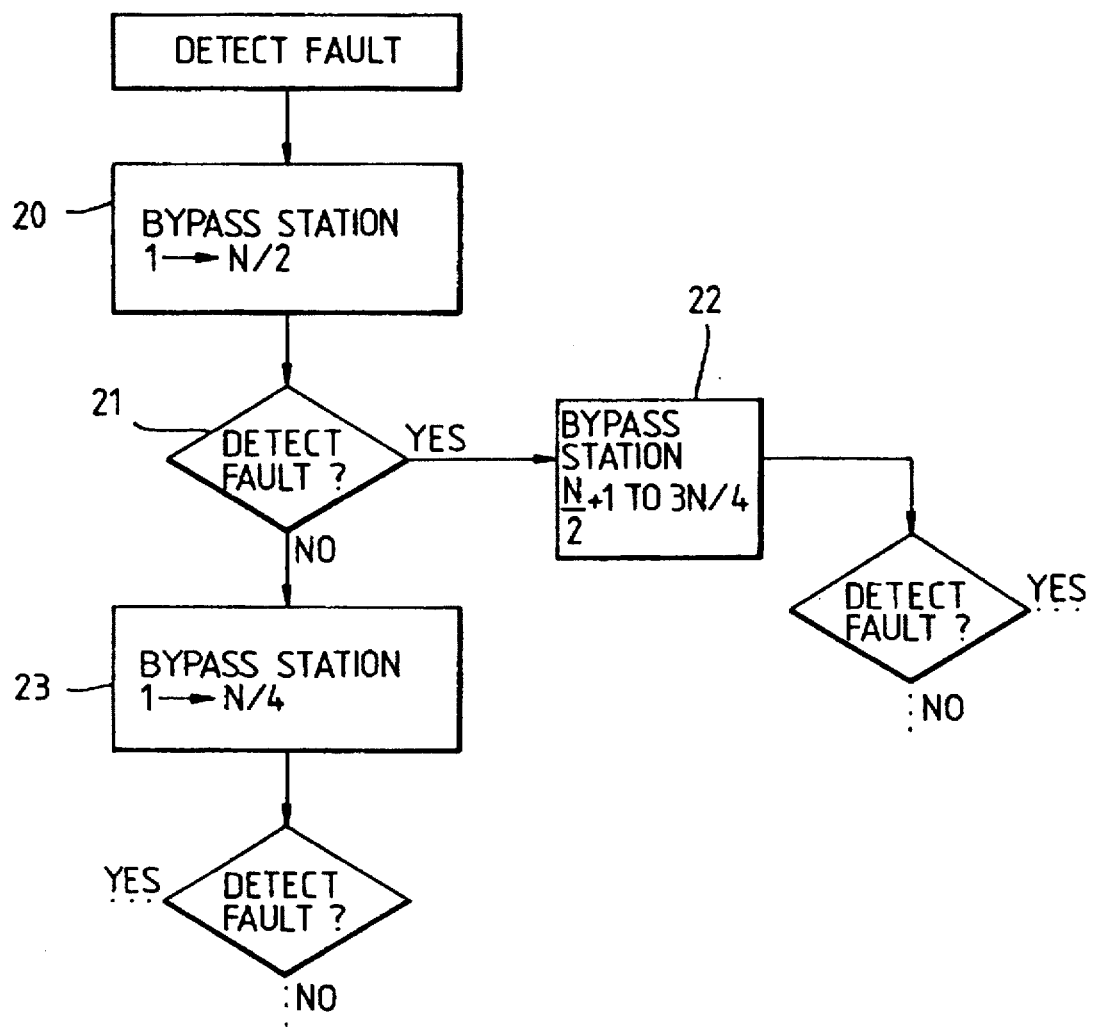
FIG. 2 is part of a flow diagram illustrating one method for operating the fault analysis procedure.

In the first example, the controller 8 records in a memory 11 the addresses of either or both of the most recent end station to be connected to the ring and the last end station to have been the source of a fault. When one of the monitor nodes 10, 30 subsequently detects a fault on the ring, the controller 8 commences its analysis to locate the source of the fault by firstly actuating the bypass switch 7 associated with one of the end stations whose address is stored in the memory 11. The likelihood is that it is the last end station to have joined the ring or the last to have been the source of a fault which is the source of the current fault. If, in fact, the fault is still present on the ring when the end station or end stations have been bypassed then the controller 8 will a) revert to conventional procedures to locate the actual source of the fault, b) make use of the procedures to be described below in connection with FIG. 2, or c) next check the penultimate end station to have joined the system if this is recorded in the memory 11. Process c) could be extended to successively older end stations or end stations which have been the source of successively older faults.

An alternative approach to locating the source of the fault involves a so-called binary chop process. In this case, illustrated partly in flow diagram form in FIG. 2, when one of the monitor nodes 10, 30 detects a fault, the controller 8 initially bypasses half the end stations connected to the concentrator 1. If therefore there are N such stations then the controller 8 will firstly bypass stations 1 to N/2 inclusive (step 20). The controller 8 will then determine whether the downstream monitor node 10 continues to detect a fault (step 21). If a fault is still detected, this indicates that one of the non-bypassed stations is the source of the fault. Consequently the controller 8 will then bypass half of the remaining non-bypassed stations, for example, stations N/2+1 to 3N/4 inclusive (step 22). The controller 8 again determines whether the downstream monitor node 10 has detected the fault and the process continues until only one station is present, namely the faulty station.

If in step 21 no fault is detected, this indicates that it is one of the bypassed stations which has caused the fault. Consequently, half of those bypassed stations are reinserted on the ring while the remaining stations, for example 1 to N/4 inclusive remain bypassed (step 23). The presence or absence of a fault is then detected and the process repeated until an end station is isolated as the source of the fault.

In a third example, as described above, the controller 8 can make use of error recovery frames in an existing ring communication protocol, for example the IEEE 802.5 protocol. The monitor nodes 10, 30 will detect the arrival of error recovery frames indicating the presence of a fault on the ring, the frames having been generated by one of the end stations, and the downstream monitor node 10 will pass to the controller 8 the address or addresses of the end station or end stations contained in the error recovery frames defining the end station or end stations adjacent the fault. The controller 8, from its knowledge of the addresses of stations on the ring and the end station ports which have active end stations connected to them, can then determine which end station should be bypassed. This is an automatic procedure not requiring any decision by a user of the system and is particularly useful where for example end stations have addresses which are not readily understandable to the lay user; where end stations are not connected to each bypass switch or where significant delay in fixing a fault leads to loss of data or a lengthy recovery procedure.

I claim:

1. A method of analysing a communication system to locate a source of a fault, the communication system comprising a signal carrying medium coupled to a series of end station ports which enable respective end stations to transmit signals onto and receive signals from said signal carrying medium; and control means for controlling a connection of end stations to said signalling carrying medium via said end station ports, the method comprising the steps of:

upon detection of a fault, disconnecting end stations in series from said signal carrying medium;

detecting whether or not a fault condition still exists; and causing said control means firstly to disconnect an end station which has previously been characterised as the most likely to be the source of the fault, under control of fault analysis means adapted to respond to fault detection.

2. A method according to claim 1, wherein a first end station to be disconnected is one of the most recent end station to have been connected to the communication system and the last end station which has been diagnosed as causing a fault.

3. A method of analysing a communication system to locate a source of a fault, the communication system comprising a signal carrying medium coupled to a series of end station ports which enable respective end stations to transmit signals onto and receive signals from said signal carrying medium; and control means for controlling a connection of said respective end stations to the medium via the ports, the method comprising the steps of:

a) causing said control means to disconnect a group of said end stations;

b) detecting whether the fault exists;

c) i) if it does, disconnecting a group of remaining end stations, or ii) if it does not, reconnecting a number of end stations of a previously disconnected group;

d) detecting whether the fault exists; and, e) repeating steps (c) and (d) until the end station causing the fault is located.

4. A method according to claim 3, wherein the group of stations which are disconnected at each stage is substantially half of the remaining end stations.

5. A communication system comprising:

a signal carrying medium coupled to a series of end station ports which enable respective end stations to transmit signals onto and receive signals from said signal carrying medium;

control means for controlling a connection of end stations to said signal carrying medium via said end station ports; and fault analysis means for detecting a source of a fault on the system, the fault analysis means being adapted to carry out a method comprising the steps of:

upon detection of a fault, disconnecting end stations in series from said signal carrying medium;

detecting whether or not a fault condition still exists; and causing said control means firstly to disconnect an end station which has previously been characterised as the most likely to be a source of the fault, under control of fault analysis means adapted to respond to fault detection.

6. A system according to claim 5, wherein said control means and fault analysis means are provided within a concentrator unit and are defined at least in part by a suitably programmed microprocessor.

7. A system according to claim 5, wherein the system is a ring communication system.

8. A communication system comprising:

a signal carrying medium coupled to a series of end station ports which enable respective end stations to transmit signals onto and receive signals from said signal carrying medium;

control means for controlling connection of end stations to said signal carrying medium via said end station ports; and fault analysis means for detecting a source of a fault on the system, the fault analysis means being adapted to carry out a method comprising the steps of:

a) causing said control means to disconnect a group of said end stations;

b) detecting whether the fault exists;

c) i) if it does, disconnecting a group of remaining end stations, or ii) if it does not, reconnecting a number of end stations of a previously disconnected group;

d) detecting whether the fault exists; and, e) repeating steps (c) and (d) until the end station causing the fault is located.

9. A system according to claim 8, wherein said control means and fault analysis means are provided within a concentrator unit and are defined at least in part by a suitably programmed microprocessor.

10. A system according to claim 8, wherein the system is a ring communication system.

* * * * *